Patented Feb. 17, 1942

2,273,593

UNITED STATES PATENT OFFICE 2,273,593

RESINS CONTAINING RUBBER

Cyril Aubrey Redfarn and Philip Schidrowitz, London, England, assignors to The British Rubber Producers' Research Association, London, England, a corporation of Great Britain No Drawing. Original application October 12, 1938, Serial No. 234,708. Divided and this application July 19, 1939, Serial No. 285,416. In Great Britain September 22, 1937

8 Claims. (Cl. 260—768)

This invention relates to the treatment of rubber with more especial reference to the preparation of modified rubber derivatives or synthetic resins containing additional organic substances, being subject-matter divided out of copending application Serial No. 234,708.

Broadly stated a process for the preparation of synthetic resinous products according to the present invention consists in simultaneously treating rubber with maleic anhydride and a phenol at about the boiling point of the phenol.

Preferably the reaction is carried out in the presence of oxygen or air whereby it is considerably accelerated and during which probably some degradation and possibly also cyclisation of the rubber take place. Conveniently also the ratio of rubber to maleic anhydride is three units of isoprene ($C_5H_8$) to one unit of maleic anhydride ($C_4H_2O_3$), although satisfactory resins are obtained with as little as one-fifth of this amount of maleic anhydride which is conveniently added in successive portions during the reaction.

For the preparation of moulding compositions the next stages of the process as described in the aforementioned copending application Serial No. 234,708 conveniently follow the accepted practice for phenol formaldehyde in so far as the phenol-maleic anhydride-rubber complex is condensed with insufficient formaldehyde in an acid medium to give a substantially non-hardening resin which is then incorporated by hot rolling with fillers such as wood-flour, colouring substances, a mould lubricant such as stearic acid and hexamethylene tetramine as hardening agent in sufficient quantity to bring the phenol formaldehyde ratio to 1:1·5. For the preparation of resins for other purposes, e. g., when a hardening resin is desired, the proportion of formaldehyde may be increased as will be understood.

Resins may also be produced by reacting the rubber-maleic anhydride-phenol complex with other aldehydes including unsaturated aldehydes or with paraformaldehyde, hexamethylene tetramine, carbohydrates, glycerol or glycerol derivatives such as epi-chlorhydrin.

Example 1

In the practice of the invention according to one example, 50 gms. of crepe rubber 12.5 gms. of maleic anhydride and 270 gms. cresylic acid (of approximately 55% meta content) are heated under reflux with a slow stream of oxygen or air running through until a clear liquor which does not separate on cooling is obtained. To prevent undue charring of the rubber it is preferable to heat this reaction mass in an oil bath at 160°–180° C. for 2–3 hours, by which time the rubber is completely dispersed, then to add a further 12.5 gms. maleic anhydride to make a total of 25 gms., followed by three hours boiling under reflux on a gauze. If carried out below 160° C. the reaction slows down considerably while the maximum temperature at normal atmospheric pressure is dependent on the boiling point of the phenol. As described in the aforementioned copending application, the liquor is then cooled, 187 ccs. 40% formaldehyde solution added, the mixture refluxed until water separates out, and then vacuum distilled to give a product which is brown, transparent and hard when cold. By using rubber or preferably softened rubber (prepared for instance according to specification No. 2,030,191) which has been milled with a proportion of the phenol this refluxing time can be substantially reduced.

The resin may be cold mixed with for example an equal weight of 80 mesh wood-flour and with 12% hexamethylene tetramine, 4% nigrosine, 1% lime and 2% stearic acid, all calculated on the resin content and then hot milled on rollers at 90° C. until the material is judged to retain only just sufficient plasticity to cure in the minimum time when disintegrated and moulded.

In the condensation of the rubber maleic anhydride phenol complex with formaldehyde, catalysts such as sulphuric or oxalic acid may be added to hasten the combination, but it has been found that the reaction proceeds quite rapidly enough in the absence of added catalysts. This may be due either to the catalytic effect of free maleic acid, or to the enhanced reactivity of the phenol owing to its combination with maleic anhydride and rubber.

With regard to the reactance taking place in the formation of the rubber-phenolic complex, during the first refluxing stage in the presence of a stream of oxygen or air, it is believed that there is simultaneous combination of maleic anhydride with rubber by addition at the double bonds and esterification of the acid anhydride group with phenolic hydroxy-groups, and at the same time a certain amount of degradation, oxidation, and cyclisation of the rubber may take place. In the second refluxing stage with formalin the generally accepted methylene-bridge formation, chiefly ortho to ortho, to give chain compounds is assumed to take place. Finally, when the material is heated with hexamethylenetetramine, cross-linking by methylene bridges, chiefly para to para, to give an infusible product is assumed to take place by a similar mechanism to that now generally accepted for plain phenol-formaldehyde moulding compositions.

Example 2

At the present time maleic anhydride is the most expensive constituent, and the following example indicates how a satisfactory resin may be obtained with a considerably smaller proportion of maleic anhydride:

50 gms. crepe rubber, 270 gms. phenol, 2.5 gms. maleic anhydride are refluxed with a slow stream of oxygen running through until a clear solution is obtained. A further 2.5 gms. maleic anhydride are added and the liquor refluxed for four hours at 180° C. with oxygen running through.

216 ccs. formalin containing 0.6 gm. oxalic acid are then added at 60° C. and the liquor again refluxed at the boiling point for 40 minutes. Finally the material is vacuum distilled to give a clear resin which is hard when cold.

Example 3

The rubber content may be increased as shown by the following example:

100 gms. rubber, 50 gms. maleic anhydride and 270 gms. cresol are refluxed for 12 hours at the boiling point with a slow stream of oxygen or air running through, by which time the rubber is completely dispersed. The maleic anhydride may be added in portions at successive stages of the refluxing period. 187 ccs. formalin are added at 60° C. and refluxed until water separates out followed by vacuum distillation to give a clear resin which is solid when cold.

The above examples indicate the different formaldehyde equivalents of phenol and cresol respectively and that the maleic anhydride and rubber proportions may be widely varied within the range aforementioned.

It will be understood that the process is not confined to the particular examples furnished and that other phenols may be used; that varying quantities of rubber with varying amounts of maleic anhydride may be utilised, or less rubber with the appropriate amounts of maleic acid may be employed, although with increasing amounts of rubber the refluxing time is progressively extended. Further that the complex may be condensed with the aldehyde or other reagent in an acid or in an alkaline medium.

Crepe, smoked sheet, softened rubber, nitrite crumb or even latex may be employed and vulcanising ingredients such as sulphur and accelerators may be added to the moulding composition. For instance in the case of ammonia preserved latex a volume of latex containing the appropriate amount of rubber is added to the phenol and maleic anhydride, and the mixture heated with air running through. The temperature is raised, the water boils and escapes out of the top of the reflux condenser. After the removal of the water the phenol starts to boil and the rubber disperses as in the foregoing examples.

What we claim is:

1. A process for the preparation of synthetic resinous products consisting in simultaneously treating rubber with maleic anhydride and a phenol at about the boiling point of the phenol.

2. A process for the preparation of synthetic resinous products consisting in simultaneously treating rubber with maleic anhydride and a phenol at an elevated temperature of 160°–180° C., the treatment being accelerated by being carried out in the presence of the class consisting of oxygen and air.

3. A process for the preparation of synthetic resinous products according to claim 2, wherein the maleic anhydride is added in successive operations.

4. A process for the preparation of synthetic resinous products according to claim 2, wherein the treatment is effected by refluxing the mixture at 160°–180° C. with oxygen running through until a clear solution is obtained.

5. A process for the preparation of synthetic resinous products according to claim 1, wherein the proportions of the ingredients are not less than three isoprene $C_5H_8$ units of the rubber to one $C_4H_2O_3$ unit of maleic anhydride.

6. A process for the preparation of synthetic resinous products according to claim 2, wherein the rubber is in the form of crepe.

7. A process for the preparation of synthetic resinous products according to claim 2, wherein the rubber is in the form of smoke sheet.

8. A process for the preparation of synthetic resinous products according to claim 2, wherein the rubber is in the form of latex.

CYRIL AUBREY REDFARN.
PHILIP SCHIDROWITZ.